Feb. 11, 1964  W. G. FROEDE  3,120,815
SEAL FOR ROTARY MECHANISMS
Filed Aug. 2, 1961  3 Sheets-Sheet 1
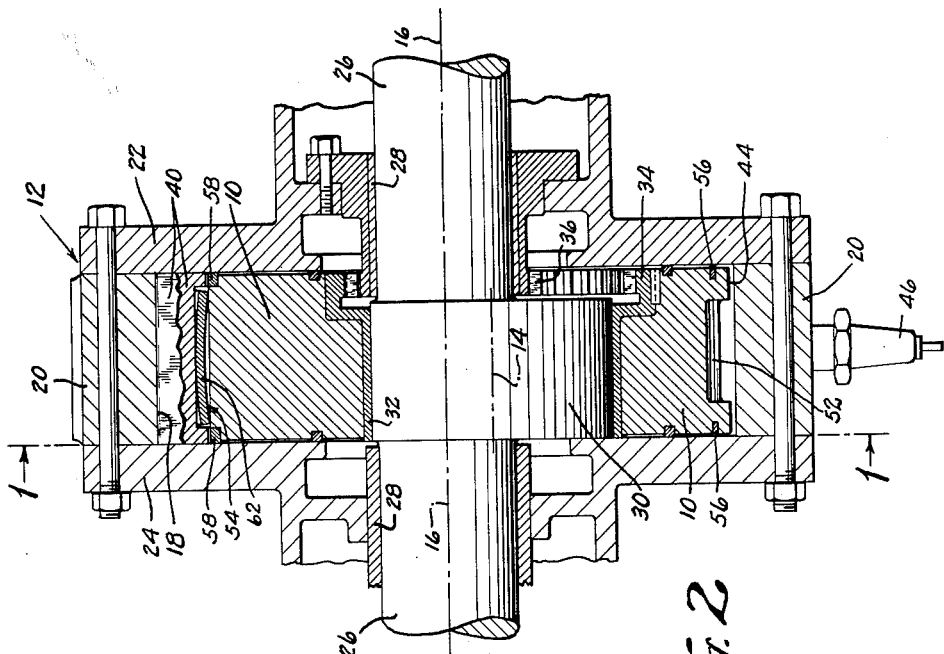
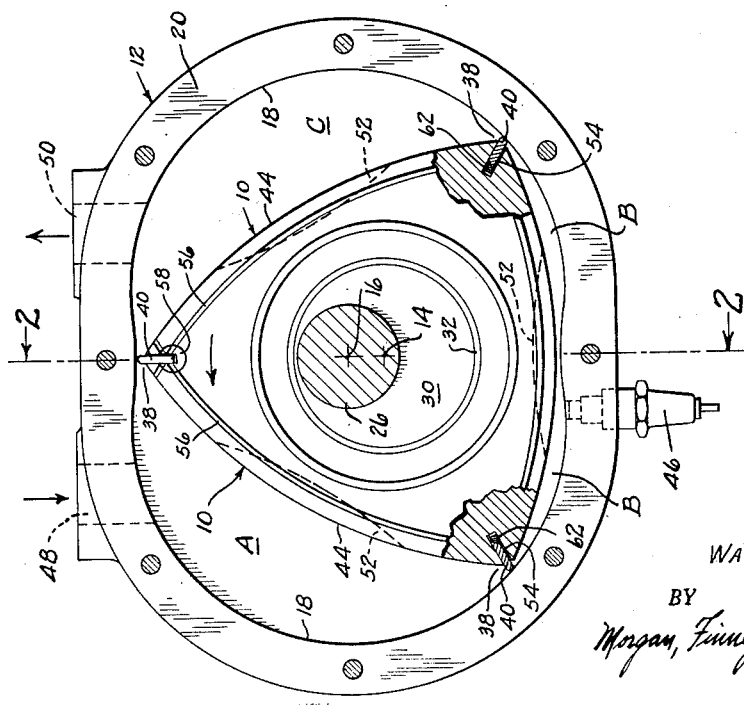
INVENTORS
WALTER G. FROEDE
BY
Morgan, Finnegan, Durham & Pine
ATTORNEYS.

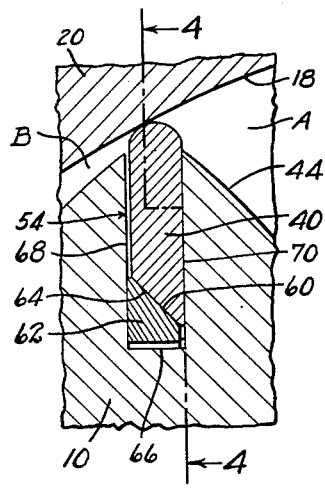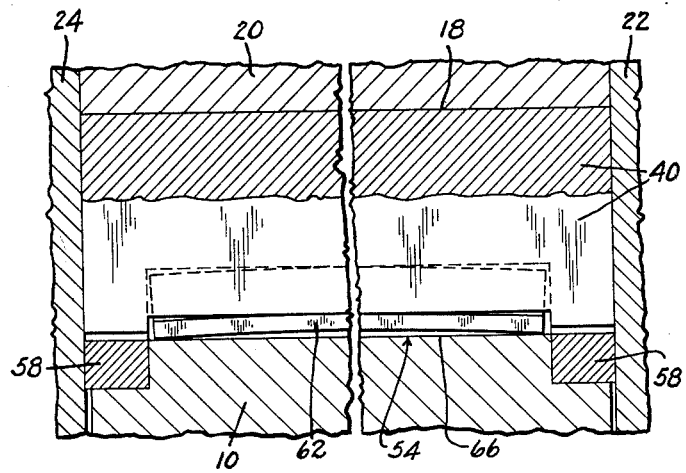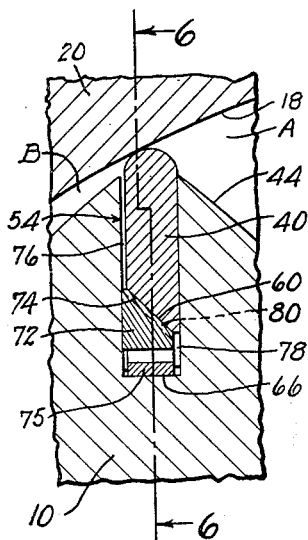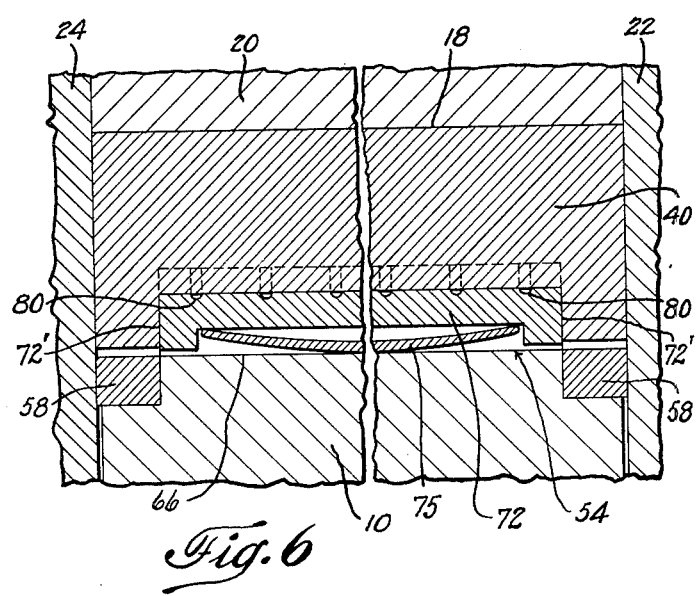

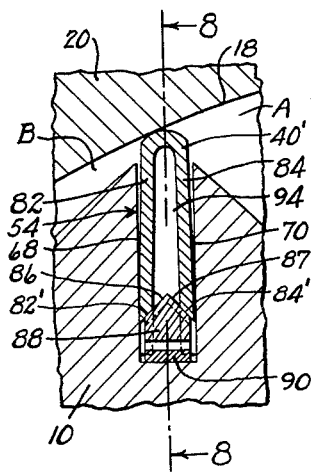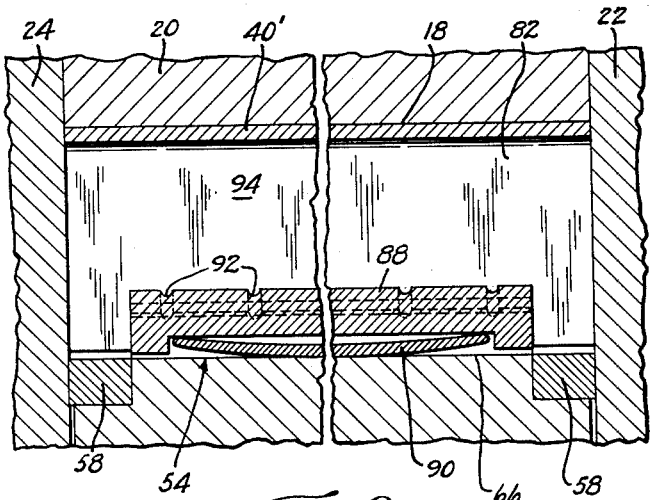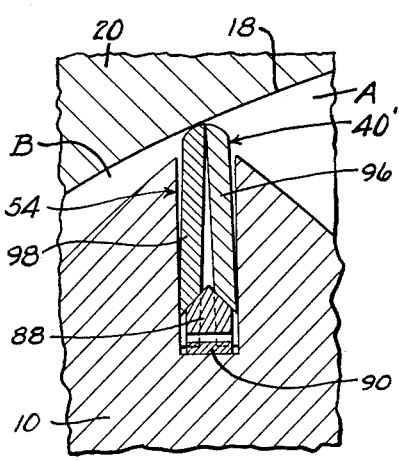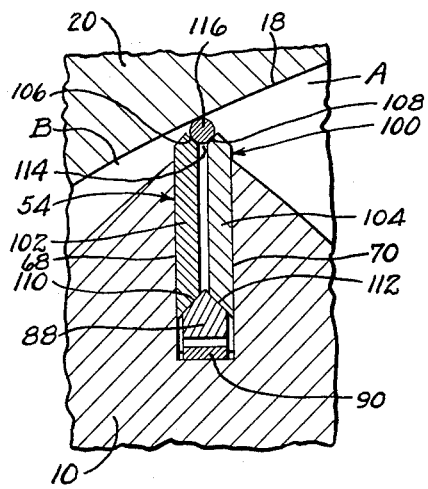
Feb. 11, 1964 — W. G. FROEDE — 3,120,815
SEAL FOR ROTARY MECHANISMS
Filed Aug. 2, 1961 — 3 Sheets-Sheet 3
Fig. 7
Fig. 8
Fig. 9
Fig. 10
INVENTORS
WALTER G. FROEDE
BY Morgan, Finnegan, Durham & Pine
ATTORNEYS.

United States Patent Office 3,120,815
Patented Feb. 11, 1964

3,120,815
SEAL FOR ROTARY MECHANISMS
Walter G. Froede, Neckarsulm, Germany, assignor to NSU Motorenwerke Aktiengesellschaft, Neckarsulm, Germany, and Wankel G.m.b.H., Bodensee, Germany
Filed Aug. 2, 1961, Ser. No. 128,765
25 Claims. (Cl. 103—130)

This invention relates to sealing means for rotary mechanisms, and more particularly to sealing means for rotary combustion engines that will effectively and efficiently seal the variable volume working chambers of the engine one from the other regardless of large differences in pressure existing between adjacent engine chambers to be sealed.

Although this invention is applicable to and useful in almost any type of rotary mechanism that presents a sealing requirement, such as combustion engines, fluid motors, fluid pumps, compressors, and the like, it is particularly useful in rotary combustion engines.

To simplify the explanation of the invention, the description that follows will, for the most part, be restricted to the use of the invention in a rotary combustion engine. It will be apparent from the description, however, that with slight modifications that would be obvious to a person skilled in the art the invention is equally applicable to other types of rotary mechanisms.

The present invention is particularly useful in rotary combustion engines of the type that is described in detail in Patent No. 2,988,065, issued June 13, 1961, and reference may be made to the disclosure of this patent for a detailed description of such a rotary combustion engine.

This invention relates to sealing means for such rotary combustion engines. These rotary combustion engines comprise an outer body having an axis, axially-spaced end walls and a peripheral wall interconnecting the end walls. The inner surface of the peripheral wall and the end wall form a cavity and the engine also includes a rotor that is mounted within the cavity between its end walls.

The axis of the rotor is eccentric from and parallel to the axis of the cavity of the outer body. The rotor has axially-spaced end faces disposed adjacent to the end walls of the outer body and a plurality of circumferentially-spaced apex portions. The rotor is rotatable relative to the outer body, and its apex portions substantially continuously engage the inner surface of the outer body to form a plurality of working chambers that vary in volume during engine operation, as a result of relative rotation between the rotor and the outer body.

To seal the variable volume working chambers of a rotary combustion engine, one from the other, it has been previously known to provide a slot in each apex portion of the rotor extending in an axial direction over the entire axial width of the rotor and to provide a sealing strip within this slot. Both the single and multi-part sealing strips have been used for this purpose. With such sealing strips it has been normal to provide a certain amount of clearance between the side walls of the slot and the sides of the sealing strip, and to provide means for urging the sealing strip toward the inner surface of the peripheral wall of the outer body, hereinafter called the "running surface." With this arrangement, when a difference in gas pressure exists between two adjacent working chambers the gas on the high pressure side of the seal could enter the slot and urge the side of the sealing strip against the side wall of the slot on the low pressure side of the sealing strip to provide sealing in a peripheral direction.

It has been shown by experiments, however, that during certain phases of operation, for example, when equal pressure exists in both chambers adjacent to a sealing strip a reliable seal cannot be guaranteed, because without a pressure difference there is no means to urge the side of the sealing strip against a side wall of its apex slot.

Also, in certain types of rotary combustion engines, such as the engines disclosed in Patent No. 2,988,065, issued June 13, 1961, having an outer body with either a two-lobed or three-lobed epitrochoidal inner surface, it is possible for the direction of centrifugal force to be reversed in direction as the sealing strip moves over the portion of the inner surface of the outer body that is adjacent to the minor radius of the epitrochoidal contour of the inner surface of the outer body. As the sealing strip periodically passes by these regions of minor radius, the reversal in direction of the centrifugal force tends to lift the sealing strip off the running surface and interrupt the sealing action that is otherwise achieved.

The sealing strip can also be lifted off the running surface under the influence of other forces, such as, high frequency oscillations in one of the engine parts. When the sealing strip is lifted off the running surface, losses due to leakage result that decrease the efficiency of the rotary mechanism, and if there is sufficient or severe enough successive movement of the sealing strip off and then back toward the running surface, the running surface itself may be damaged.

In view of the obvious disadvantages of allowing the sealing strip to lift off the running surface at any time during engine operation, it is a primary object of this invention to provide means for sealing the working chambers of a rotary mechanism that will ensure substantially continuous sealing engagement of the sealing means with the running surface of the outer body.

It is another object of this invention to provide a sealing means for sealing the working chambers of a rotary mechanism by providing means for ensuring that at least one side of a sealing strip will at all times be in resilient frictional contact with at least one side wall of the slot in which it is carried.

Another object of this invention is to provide a sealing means for sealing the working chambers of a rotary mechanism that provides means to brake and resist any tendency of a sealing strip mounted within the rotor to lift off of the running surface.

It is another object of this invention to provide means for sealing the chambers of a rotary mechanism that uses gas pressures within the chambers of the mechanism to aid in enforcing and maintaining adequate sealing contact between the sealing means and the running surface.

To achieve the foregoing objects, and in accordance with its purpose, this invention provides means which, as embodied and broadly described, comprise a novel combination for sealing the working chambers of a rotary mechanism, one from the other, by achieving sealing means that aids in achieving desirable sealing between a sealing strip and the running surface by ensuring that substantial resilient frictional contact exists at all times between at least one side of the sealing strip and at least one side wall of the slot that carries the sealing strip.

This desired resilient frictional contact can be achieved by spring means arranged between at least one side surface of the sealing strip and the adjacent side wall of the slot. The sealing strip can also, preferably at its inner end, be provided with an inclined surface that cooperates with a wedge-shaped element which is resiliently urged against the inclined surface of the end of the seal along a plane of contact of the two surfaces. By the mutual action between the wedge and the inclined surface the sealing strip is pressed towards the running surface as well as towards the side wall of its slot. This cooperative action between the wedge and the inclined surface results in considerable resistance against movement of the sealing strip off the running surface or away from the wall of the slot.

Also, the mutual cooperation of the wedge and inclined surface has the additional advantage of preventing a cocking or tilting of the sealing strip within its slot against the upper edge of the slot and thus ensures that gas pressures will not be prevented from entering the slot.

When the objects of this invention are achieved through the mutual cooperation of the inclined surface and the wedge, a channel may preferably be provided in the plane of contact between the inclined surface of the sealing strip and the wedge-shaped surface to permit the gas pressure to be transported underneath the sealing strip to urge it toward the running surface. This channel or channels connects the parts of the slot that would otherwise be sealed from each other by the plane of contact between the inclined surface and the wedge. By providing the channel, this form of the invention permits the gas pressure to act directly on the lower side of the sealing strip. Further, it is possible to provide an embodiment of the invention to permit the gas pressure to act on the lower side of the wedge-shaped member so that the sealing strip is urged outward toward the running surface by means of the wedge-shaped member.

The wedge-shaped surface that cooperates with the inclined surface on the sealing strip may be provided on an insert member positioned within the slot underneath the sealing strip. Optionally, several insert members may be provided and they need not necessarily extend over the entire axial length of the sealing strip. It is also possible to form the insert member providing the wedge-shaped surface in the form of a spring.

In a still further form of this invention, a U-shaped sealing strip may be provided that contains a central groove in an axial direction to give it a U-shape. Each leg of this U-shaped sealing strip can then be provided at its inner end with an inclined surface that co-acts with a complementary wedge-shaped surface so that a positive contact of the sealing strip is obtained against both side walls of the slot.

The same desirable results can be obtained when the sealing strip of this invention has, for example, a U-shaped cross-section and is made resilient in and of itself, so that the inner ends of the legs resiliently engage both side walls of the slot at least during critical phases of engine operation, and especially when equal or substantially equal pressures exist in the two working chambers adjacent to the seal, as will be explained in detail in the description that follows.

The legs of the foregoing U-shaped sealing strip are preferably spread by gas pressure entering the slot and acting underneath and within the groove of the sealing strip. Also, with this type of sealing strip, an insert member, e.g., a double-faced wedge, may be placed underneath the sealing strip to help spread the leg of the sealing strip against the side walls of the slot. If the sealing strip should tend to move radially inward under the influence of some external force, its legs will be spread by the wedge and the seal will be blocked from further inward travel.

It is also possible to make the insert member radially movable responsive to the action of the gas pressure or of a spring. The ends of the legs of the sealing strips themselves can be formed in such a manner that they will become locked against the side walls of the slot upon inward movement of the sealing strip. Sealing strips of the general configuration just discussed can be easily made from sheet metal pressing and also help achieve economy and simplicity in manufacture in that the slot receiving the sealing strip can be made with larger tolerances than would otherwise be possible and without sacrificing sealing efficiency.

Additional objects and advantages of the invention will be set forth in part in the description that follows and in part will be obvious from the description or may be learned by practice of the invention, the objects and advantages being realized and attained by means of the instrumentalities and combinations particularly pointed out in the appended claims.

The invention consists in the novel parts, constructions, arrangements, combinations, and improvements shown and described.

The accompanying drawings that are incorporated in and constitute a part of this specification illustrate one embodiment of the invention and together with the description serve to explain the principles of the invention.

Of the drawings:

FIG. 1 is a side elevation view of one type of rotary combustion engine with which the present invention may be used. This view shows the engine as it appears with one end wall of the outer body removed and as taken along the line 1—1 of FIG. 2;

FIG. 2 is a central vertical section taken along the line 2—2 of FIG. 1;

FIG. 3 is a sectional view of one embodiment of this invention showing the sealing strip in its associated slot. FIG. 3 shows this embodiment of the invention as it appears when forming the seal between chambers A and B of FIG. 1 with the rotor in the position shown in FIG. 1. The remaining figures of the drawings that show other embodiments of this invention also show these embodiments in the form in which they would appear when providing sealing between chamber A and chamber B with the rotor in the position as shown in FIG. 1;

FIG. 4 is a sectional view taken along the line 4—4 of FIG. 3;

FIG. 5 is a sectional view of another embodiment of this invention;

FIG. 6 is a sectional view taken along the line 6—6 of FIG. 5;

FIG. 7 is a sectional view of a sealing means forming a third embodiment of this invention;

FIG. 8 is a sectional view taken along the line 8—8 of FIG. 7;

FIG. 9 is a sectional view of a sealing means forming a fourth embodiment of this invention; and FIG. 10 is a sectional view of a sealing means forming a fifth embodiment of this invention.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

In accordance with the invention, a rotary combustion engine and novel means for sealing the working chambers of such an engine, one from the other, are provided. As embodied and as shown in FIGS. 1 and 2, the present preferred embodiment of the invention includes a rotary combustion engine comprising a generally triangular rotor 10 having arcuate sides that is eccentrically supported for rotation within an outer body 12.

Although in the illustrative embodiment shown in the drawings, the outer body 12 is fixed or stationary, a practical and useful form of the invention may be constructed in which both the outer body and rotor are rotary; in the latter form of the invention, the power shaft is driven directly by rotation of the outer body and the inner body or rotor rotates relative to the outer body.

As shown in FIGS. 1 and 2, and as here preferably embodied, the rotor 10 rotates on an axis 14 that is eccentric from and parallel to the axis 16 of the curved inner surface 18 of the outer body 12. The distance between the axes 14 and 16 is equal to the effective eccentricity of the engine. The curved inner surface 18 of the outer body 12 has basically the form of an epitrochoid in geometric shape and includes two arched lobe-defining portions or lobes.

As embodied, the generally triangular shape of the rotor 10 corresponds in its configuration to the "inner envelope" or the maximum profile of the rotor that will permit interference-free rotation of the rotor 10 within the outer body 12.

In the form of the invention illustrated, the outer body 12 comprises a peripheral wall 20 that has for its inner surface the curved inner surface 18, and a pair of axially-spaced end walls 22 and 24 that are disposed on opposite sides of the peripheral wall 20.

The end walls 22 and 24 support a shaft 26, the geometric center of which is coincident with the axis 16 of the outer body 12. This shaft 26 is supported for rotation by the end walls 22 and 24 on bearings 28. A shaft eccentric 30 is rigidly attached to one end face of the rotor 10. The ring gear 34 is in mesh with an externally-toothed gear or pinion 36 that is rigidly attached to the stationary end wall 22 of the outer body 12.

From this construction, it may be observed that the gearing 34 and 36 does not drive or impart torque to the shaft 26 but serves to index or register the position of the rotor 10 with respect to the outer body 12 and to keep the rotor in phase as the rotor rotates relative to the outer body. The gearing also enforces the desired speed ratio between the rotor and the shaft and removes the positioning load that would otherwise be placed upon the apex portions of the rotor 10.

As shown most clearly in FIG. 2, the rotor 10 includes three apex portions 38 that carry radially movable sealing strips 40. The sealing strips 40 are in substantially continuous gas-sealing engagement with the inner surface 18 of the outer body 12 as the rotor 10 rotates within and relative to the outer body 12.

By means of the rotation of the rotor 10 relative to the outer body 12, three variable volume working chambers A, B, and C are formed between the peripheral working faces 44 of the rotor 10 and the inner surface 18 of the outer body 12. As embodied in FIG. 1, the rotation of the rotor relative to the outer body is counterclockwise and is so indicated by an arrow.

A spark plug 46 is mounted in the peripheral wall 20 of the outer body 12, and at the appropriate time in the engine cycle, the spark plug 46 provides ignition for a compressed combustible mixture which, on expansion, drives the rotor in the direction of the arrow. The rotary combustion engine may also be operated as a diesel, and when it is operated as a diesel, the spark plug 46 is not required, since ignition of the fuel is initiated by the temperature reached through high compression of the working air.

Also as shown in FIG. 1, one lobe of the epitrochoidal inner surface 18 is provided with an intake port 48 and the other lobe is provided with an exhaust port 50. As the rotor 10 rotates, a fresh charge is drawn into the appropriate chamber (chamber A as shown in FIG. 1) through the intake port 48. This charge is then successively compressed, ignited, expanded, and finally exhausted through the exhaust port 50.

All four successive phases of the engine cycle: intake, compression, expansion, and exhaust, take place within each one of the variable volume working chambers A, B, and C, each time the rotor 10 completes one revolution within the outer body, and for each revolution of the rotor, the engine completes a cycle.

The working faces 44 of the rotor 10 are provided with cut-out portions or channels 52 that permit combustion gases to pass freely from one lobe of the epitrochoidal inner surface 18 to the other lobe when the rotor is at or near the dead center of maximum compression position. Also, a desired compression ratio for the engine may be attained by appropriate proportioning of the volume of the channels 52.

In the present preferred embodiment the gear ratio between the gearing 34 and 36 is 3:2 so that each time the rotor 10 completes one revolution about its own axis 14, the shaft 26 rotates three times about its axis 16. The gearing thus enforces a speed ratio between the shaft 26 and the rotor 10 of 3:1.

As shown in FIGS. 1 and 2, sealing strips 40 are carried with clearance in each slot 54, and these sealing strips 40 continuously slide on the inner surface 18, or running surface 18 and thus seal the three working chambers A, B, and C from one another in a peripheral direction. The rotor 10 is also provided on each of its end faces with end face seals 56 that are axially movable and that are connected with sealing strips 40 by axially-movable connecting seals 58. The three different types of seals, the sealing strips 40, the end face seals 56, and the connecting seals 58, thus serve to seal each of the chambers A, B, and C, one from the other.

In accordance with the invention, novel means are provided for sealing the working chambers, one from the other, in the peripheral direction. As here preferably embodied and as shown in one embodiment of FIGS. 3 and 4, the inner end 60 of the sealing strip 40 is bevelled to provide an inclined surface. A spring 62 that has a corresponding inclined surface 64 is urged against the inclined surface 60 of the sealing strip 40 and abuts against the bottom 66 and side wall 68 of the slot 54.

In operation, the sealing strip 40 is urged into resilient frictional contact with the side wall 70 of slot 54 and radially outward towards running surface 18 by spring 62 and by the gas pressure that exists in working chamber B and enters the slot 54 in the clearance between the sealing strip 40 and the side wall 68 of the slot. Any tendency of the sealing strip 40 to lift off or pull away from the running surface 18 and the side wall 70 of the groove 54 is prevented by the wedging action provided by the cooperation of the inclined surface 60 of the sealing strip 40 and the inclined surface 64 of the spring 62.

In accordance with the invention, a second embodiment of the novel means for sealing the engine chambers, one from the other, is provided. As here preferably embodied, and as shown in FIGS. 5 and 6, this embodiment includes a rigid insert member 72 instead of the spring 62 of the embodiment of FIGS. 3 and 4. The insert member 72 comprises an inclined surface 74 and is urged toward the inclined surface 60 of the sealing strip 40 by a spring 75. In operation and effect this embodiment is the same as the embodiment of FIGS. 3 and 4.

If the embodiment of FIGS. 5 and 6 is constructed in a form in which the insert member 72 has the same axial width as the receiving recess 72′ in the sealing strip 40, the slot 54 will be divided into two parts 76 and 78, as shown in FIG. 5, and these parts will be completely separated from each other.

To ensure that the gas pressure in working chamber B will act on the sealing strip 40 in this embodiment to urge it toward the running surface 18, the inclined surface 74 is provided with a series of channels 80, that serve to interconnect the separated parts 76 and 78 of the slot 54. This interconnection enables the gas pressure to act on the inclined surface 60 of the sealing strip 40 and thus supplements the action on the sealing strip 40 obtained through the cooperation and coaction of the two inclined surfaces 60 and 74. Also, the gas pressure, through the interconnection afforded by the channels 80 can act from underneath the insert member 72 to assist the action of the spring 75 in urging the insert member 72 radially outward from the bottom 66 of the slot 54.

In accordance with the invention, a third embodiment of the novel sealing means for sealing the chambers of a rotary combustion engine, one from the other, is provided. As here preferably embodied, this third embodiment is shown in FIGS. 7 and 8 and comprises a sealing strip 40′ having a U-shaped cross section. Its legs 82 and 84 are provided at their inner ends with inclined surfaces 82′ and 84′. The inclined surfaces 82′ and 84′ cooperate with corresponding wedge-shaped surfaces 86 and 87 of insert member 88 that is urged radially outward by spring 90.

In operation, the legs 82 and 84 are spread apart through the wedge action of the insert member 88 and are forced into contact with the side walls 68 and 70 of the slot 54. The surfaces 86 and 87 may optionally be provided with channels 92 through which the gas pressure may enter the enclosed space 94.

This embodiment has a particularly desirable feature. To illustrate, if a higher pressure is in working chamber B than in working chamber A, as would be expected, the gas pressure will act on leg 82 and urge it to the right, as shown in FIG. 7 with the result that the sealing strip 40' will be urged radially outward toward the running surface 18 through the cooperative action between the inclined surfaces 82' and 84' and wedge-shaped surfaces 86 and 87. As the leg 82 is lifted off or away from the side wall 68, the gas pressure can enter the cavity or enclosed space 94 through the channels 92 and can also act underneath the insert member 88.

If, after the foregoing has taken place, the pressure in chamber B decreases, the pressure in cavity 94 will not at once simultaneously decrease, and therefore, this pressure will urge the leg 82 toward the side wall 68 and at the same time urge the sealing strip 40' toward the running surface 18. In this embodiment, it is thus possible to use gas pressure to keep the sealing strip 40' in contact with the running surface 18, as well as in contact with the side walls 68 and 70 of the slot 54, even when the chambers A and B attain a condition of equal pressure. Accordingly, flutter of the sealing strip 40' within its slot 54 is effectively prevented.

A still further advantage of this embodiment is that it is not necessary to hold the machining of the slot 54 to narrow tolerances during manufacture, and further economies can be achieved in manufacture with this embodiment with the use of a sheet metal pressing to form the sealing strip itself. Also, the sealing strip 40' can be made resilient in and of itself so that its legs 82 and 84 will engage the walls of the slot under internal tension. Still further, the ends of the legs of this embodiment can be formed in a manner so that they will enter into locking engagement with the side walls 68 and 70 of the slot 54 when the sealing strip 40' tends to move radially inward.

A fourth embodiment of this invention is shown in FIG. 9. In general the same operation and effects are achieved with the embodiment of FIG. 9 as the embodiment of FIGS. 7 and 8. The major difference between the embodiment of FIG. 9 and the embodiment of FIGS. 7 and 8 is that the sealing strip 40'' is made from two parts 96 and 98 and these two parts act in virtually the same manner as do the legs 82 and 84 of the embodiment of FIGS. 7 and 8.

A fifth preferred embodiment of this invention is illustrated in FIG. 10. This fifth embodiment comprises a sealing strip 100 that is divided into two parts 102 and 104 in an axial or longitudinal direction. These two parts 102 and 104 have inclined surfaces 106 and 108 at their radially outer ends as well as the usual inclined surfaces 110 and 112 at their radially inner ends. The two inclined surfaces 106 and 108 form a V-groove 114. A spreader body 116 in the shape of a rod with a circular cross section is positioned in the V-groove 114 formed by the inclined surfaces 106 and 108. This spreader body 116 slides in sealing engagement on the running surface 18.

The insert member 88 is urged by the spring 90 towards the inclined surfaces 110 and 112 of the parts 102 and 104 and urges these parts away from each other and toward the side walls 68 and 70 of the slot 54 as well as radially outward toward the spreader body 116. By this combined simultaneous urging in two directions a spreading action is exerted on the radially outer ends of the parts 102 and 104 as well as on their radially inner ends, so that they are in resilient frictional contact with the side walls 68 and 70 of the slot 54 along their entire side faces. The combination comprising this embodiment thus resists forces attempting to move the sealing strip radially inward to a great extent.

This invention in its broader aspects is not limited to the specific mechanisms shown and described, but also includes within the scope of the accompanying claims any departures made from such mechanisms that do not sacrifice its chief advantages.

What is claimed is:

1. A rotary mechanism, comprising a hollow outer body, having an axis, axially-spaced end walls, and a peripheral wall interconnecting the end walls, and a rotor mounted within the outer body and rotatable relative to the outer body, the rotor having an axis parallel to the outer body axis and a plurality of circumferentially-spaced apex portions in sealing engagement with the inner surface of the peripheral wall to form a plurality of working chambers between the rotor and the inner surface of the outer body that vary in volume upon relative rotation of the rotor within the outer body, each apex portion of the rotor having a slot that extends axially across the axial width of the rotor and substantially radially relative to the rotor axis, a sealing strip carried in each slot with clearance between the side wall surfaces of each slot and its sealing strip, each sealing strip having its radially inner surface inclined relative to its sides, and means carried in each slot for continuously acting against the inclined surface of the sealing strip to urge the sealing strip both into sealing engagement with the inner surface of the peripheral wall of the outer body and into resilient frictional contact with one side wall of its slot.

2. The invention as defined in claim 1, in which the means comprises a spring positioned in the slot to act against the inclined surface of the sealing strip.

3. The invention as defined in claim 1, in which the means comprises a member having a second inclined surface in contact with the first inclined surface on the sealing strip and a second means for urging the second inclined surface against the first inclined surface whereby through co-action of the two inclined surfaces the sealing strip is urged both radially outward into sealing engagement with the inner surface of the peripheral wall and into resilient frictional contact with the side wall of its slot opposite the second inclined surface.

4. The invention as defined in claim 1, in which each leg portion has an inclined surface at its radially inner end and in which the means comprises a member having two inclined surfaces each in contact with and complementary to one of the inclined surfaces on the leg portions and a second means for urging the member radially outward whereby through co-action of the complementary inclined surfaces each leg portion of the sealing strip is urged both radially outward and into resilient frictional contact with the adjacent side wall of its slot.

5. The invention as defined in claim 1, in which the sealing strip comprises two parts and in which each part has an inclined surface at both its radially inner and outer ends, the direction of inclination of the inclined surfaces at the radially outer ends of the parts being such as to form a V-groove between the two parts, and a spreader body inserted in this V-groove that slides in sealing engagement against the inner surface of the outer body.

6. The invention as defined in claim 3, in which at least one of the inclined surfaces has at least one channel to permit gas pressure to pass from the radially outer end of the inclined surface to its radially inner end.

7. The invention as defined in claim 3, in which the member is radially movable and which also includes a spring element between the surface of the slot and the member, whereby the spring element urges the member radially outward.

8. The invention as defined in claim 3, in which the member comprises a spring.

9. The invention as defined in claim 4, in which the sealing strip has a U-shaped cross-section.

10. The invention as defined in claim 4, in which each leg portion of the sealing strip comprises a separate element and in which the central groove is provided by having the separate leg elements in contact at their radially outer ends but separated from each other at their radially inner ends.

11. The invention as defined in claim 4, in which at least one of the inclined surfaces has at least one channel to permit gas pressure to pass from the radially outer end of the inclined surface to its radially inner end.

12. The invention as defined in claim 4, in which the second means comprises a spring element between the surface of the slot and the member.

13. The invention as defined in claim 4, in which the member comprises a spring.

14. The invention as defined in claim 4, in which the sealing strip is resilient in and of itself.

15. The invention as defined in claim 14, in which the sealing strip has a U-shaped cross section and in which its leg portions are resiliently contacting both side walls of the slot.

16. The invention as defined in claim 4, in which at least one of the inclined surfaces has a channel to permit gas pressure to pass from the radially outer ends of the inclined surfaces to their radially inner ends.

17. The invention as defined in claim 10, in which the second means comprises a spring element between the surface of the slot and the member.

18. The invention as defined in claim 10, in which the member comprises a spring.

19. The invention as defined in claim 11, in which the second means comprises force generated by gas pressure.

20. The invention as defined in claim 16, in which the second means comprises force generated by gas pressure.

21. The invention as defined in claim 4, in which the sealing strip is formed from a sheet metal pressing.

22. The invention as defined in claim 9, in which the sealing strip is formed from a sheet metal pressing.

23. The invention as defined in claim 5, in which the spreader body is circular in cross-section.

24. The invention as defined in claim 6, in which the member is radially movable and is urged radially outward by force generated by gas pressure.

25. The invention as defined in claim 15, in which the ends of the leg portions are formed such that they are locked with the associated side wall of the slot upon radially inward movement of the sealing strip.

References Cited in the file of this patent

UNITED STATES PATENTS

| | | |
|---|---|---|
| 2,880,045 | Wankel | Mar. 31, 1959 |
| 2,979,042 | Bentele | Apr. 11, 1961 |

FOREIGN PATENTS

| | | |
|---|---|---|
| 14,839 | Great Britain | 1908 |
| 421,374 | Germany | Nov. 11, 1925 |